United States Patent
Dym et al.

(10) Patent No.: US 11,645,274 B2
(45) Date of Patent: May 9, 2023

(54) MINIMIZING GROUP GENERATION IN COMPUTER SYSTEMS WITH LIMITED COMPUTING RESOURCES

(71) Applicant: Intuit Inc., Mountain View, CA (US)

(72) Inventors: Jacob Wesley Dym, Boise, ID (US); Akshay Kansal, Boise, ID (US)

(73) Assignee: Intuit Inc., Mountain View, CA (US)

( * ) Notice: Subject to any disclaimer, the term of this patent is extended or adjusted under 35 U.S.C. 154(b) by 394 days.

(21) Appl. No.: 16/940,623

(22) Filed: Jul. 28, 2020

(65) Prior Publication Data

US 2022/0035800 A1 Feb. 3, 2022

(51) Int. Cl.
*G06F 16/20* (2019.01)
*G06F 16/242* (2019.01)
*G06F 16/28* (2019.01)
*G06F 9/50* (2006.01)
*G06F 16/2457* (2019.01)
*G06F 18/22* (2023.01)

(52) U.S. Cl.
CPC ............ *G06F 16/244* (2019.01); *G06F 9/505* (2013.01); *G06F 9/5072* (2013.01); *G06F 16/24578* (2019.01); *G06F 16/285* (2019.01); *G06F 18/22* (2023.01)

(58) Field of Classification Search
CPC ...... G06F 9/505; G06F 9/5072; G06F 16/244; G06F 16/285; G06F 16/24578; G06K 9/6215
See application file for complete search history.

(56) References Cited

U.S. PATENT DOCUMENTS

| | | | | |
|---|---|---|---|---|
| 10,505,825 | B1 * | 12/2019 | Bettaiah | G06F 40/174 |
| 2005/0055694 | A1 * | 3/2005 | Lee | G06F 9/4881 |
| | | | | 718/100 |
| 2008/0235216 | A1 * | 9/2008 | Ruttenberg | G06F 16/9535 |
| | | | | 707/999.005 |
| 2010/0159438 | A1 * | 6/2010 | German | G06F 16/24578 |
| | | | | 707/E17.046 |
| 2012/0297038 | A1 * | 11/2012 | Mei | G06Q 50/01 |
| | | | | 707/E17.019 |
| 2018/0096437 | A1 * | 4/2018 | Sun | G06N 20/00 |
| 2020/0174984 | A1 * | 6/2020 | Wang | G06F 16/2237 |
| 2021/0099518 | A1 * | 4/2021 | Treat | H04L 67/306 |
| 2021/0103574 | A1 * | 4/2021 | Belezko | G06F 16/2228 |

* cited by examiner

*Primary Examiner* — Tarek Chbouki
(74) *Attorney, Agent, or Firm* — Ferguson Braswell Fraser Kubasta PC

(57) ABSTRACT

A method including generating a first overlap matrix from a first attribute having first measurements of data items, and generating a second overlap matrix from a second attribute having second measurements of the data items. Samples of weights are generated, each of the samples of weights including a corresponding first weight for the first overlap matrix and a corresponding second weight for the second overlap matrix. For each of the samples of weights, the first overlap matrix is combined with the corresponding first weight and the second overlap matrix is combined with the corresponding second weight. Similarity matrices are generated by combining, for each of the samples of weights, a weighted first overlap matrix with a weighted second overlap matrix. A cluster analysis is performed on the similarity matrices to generate groupings the similarity matrices. The groupings represent groups of the data items. A selected grouping is chosen.

17 Claims, 9 Drawing Sheets

Attribute 1
(Shift Times)
400

| Worker | start_time | end_time |
|---|---|---|
| Jane | 13.02 | 17.42 |
| John | 17.42 | 17.42 |
| Vincent | 18.03 | 21.55 |
| Louise | 17.42 | 18.03 |
| Aaron | 18.45 | 23.53 |
| ... | ... | ... |

Attribute 2
(Jobs Worked)
402

Attribute 3
(Proximity of Work)
404

*FIG. 4*

| base Worker | Compared Worker | day | overlap |
|---|---|---|---|
| Jane | John | Monday | 0.5834270509 |
| Jane | Vincent | Monday | 0.274603794 |
| Jane | Louise | Monday | 0.626719835 |
| Jane | Aaron | Monday | 0.8088925182 |
| ... | ... | ... | ... |

*FIG. 5*

| Overlap Matrix 1 (Shift Times) 600 | | | | |
|---|---|---|---|---|
| Worker | Jane | John | Vincent | ... |
| Jane | 1 | 0.58 | 0.27 | ... |
| John | 0.58 | 1 | 0.6 | ... |
| Vincent | 0.27 | 0.6 | 1 | ... |
| ... | ... | ... | ... | ... |

Overlap Matrix 2
(Jobs Worked)
602

Overlap Matrix 3
(Proximity of Work)
604

| Overlap Matrix 1 (Shift Times) 600 | * | W1 of Sample of Weights 1 708 | = | Weighted Overlap Matrix 1 (Shift Times) 800 |
|---|---|---|---|---|
| Overlap Matrix 2 (Jobs Worked) 602 | * | W2 of Sample of Weights 1 710 | = | Weighted Overlap Matrix 2 (Jobs Worked) 802 |
| Overlap Matrix 3 (Proximity of Work) 604 | * | W3 of Sample of Weights 1 712 | = | Weighted Overlap Matrix 3 (Proximity of Work) 804 |
| Overlap Matrix 4 (Shift Times) 600 | * | W1 of Sample of Weights 2 714 | = | Weighted Overlap Matrix 4 (Shift Times) 806 |
| Overlap Matrix 5 (Jobs Worked) 602 | * | W2 of Sample of Weights 2 716 | = | Weighted Overlap Matrix 5 (Jobs Worked) 808 |
| Overlap Matrix 6 (Proximity of Work) 604 | * | W3 of Sample of Weights 2 718 | = | Weighted Overlap Matrix 6 (Proximity of Work) 810 |
| Overlap Matrix 7 (Shift Times) 600 | * | W1 of Sample of Weights 3 720 | = | Weighted Overlap Matrix 7 (Shift Times) 812 |
| Overlap Matrix 8 (Jobs Worked) 602 | * | W2 of Sample of Weights 3 722 | = | Weighted Overlap Matrix 8 (Jobs Worked) 814 |
| Overlap Matrix 9 (Proximity of Work) 604 | * | W3 of Sample of Weights 3 724 | = | Weighted Overlap Matrix 9 (Proximity of Work) 816 |

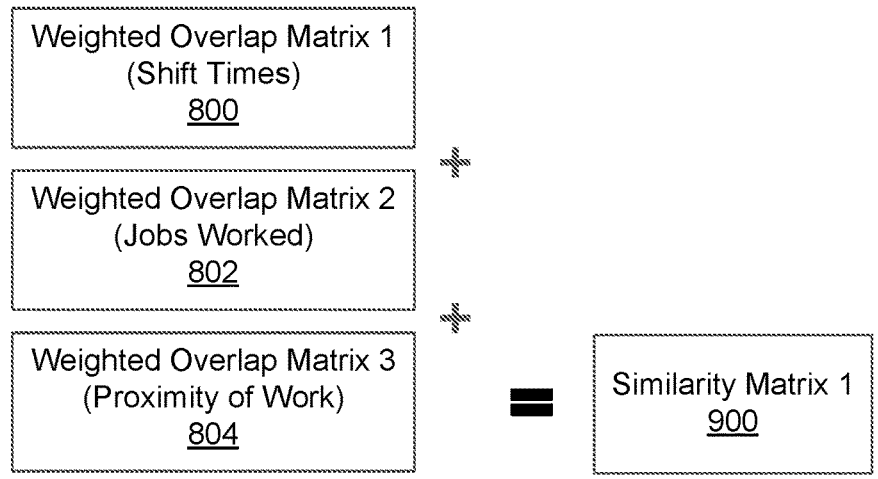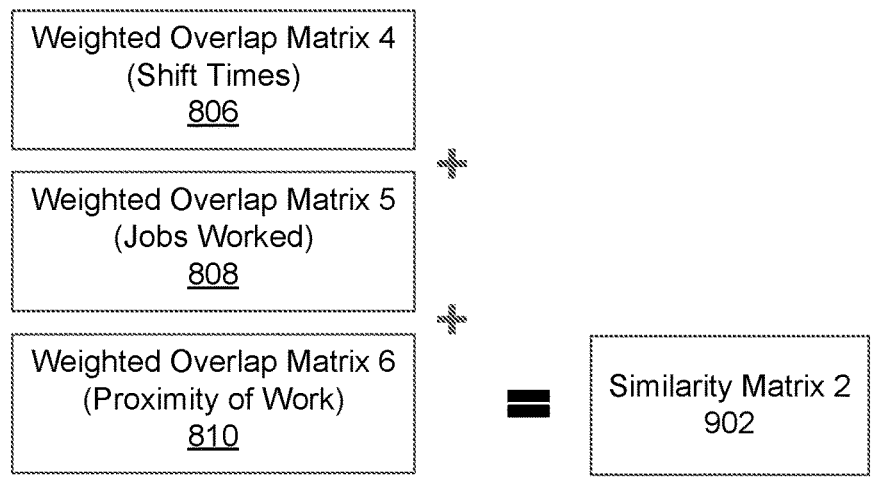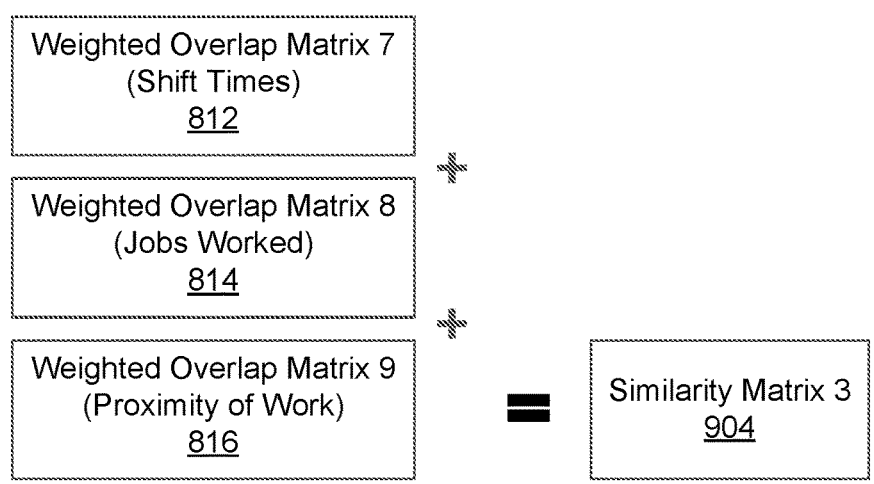
FIG. 9

MINIMIZING GROUP GENERATION IN COMPUTER SYSTEMS WITH LIMITED COMPUTING RESOURCES

BACKGROUND

Some computing tasks become difficult due to the volume of computations desired for a particular algorithm. The number of computations may become so large that even a group of modern computers lack sufficient computing resources to perform the desired algorithm within a desired amount of time.

SUMMARY

The one or more embodiments provide for a method. The method includes generating a first overlap matrix from a first attribute having first measurements of data items, and generating a second overlap matrix from a second attribute having second measurements of the data items. The method also includes generating samples of weights, each of the samples of weights including a corresponding first weight for the first overlap matrix and a corresponding second weight for the second overlap matrix. The method also includes combining, for each of the samples of weights, the first overlap matrix with the corresponding first weight and the second overlap matrix with the corresponding second weight. The method also includes generating similarity matrices by combining, for each of the samples of weights, a weighted first overlap matrix with a weighted second overlap matrix. The method also includes performing a cluster analysis on the similarity matrices to generate corresponding desired groupings for each of the similarity matrices. Each of the desired groupings represents a corresponding group of the data items. The desired groupings across the similarity matrices are a set of groupings. The method also includes selecting a group from the set of groupings to obtain a selected grouping.

The one or more embodiments provide for another method. The method includes receiving a data set representing information regarding attributes. Each of the attributes represents corresponding measurements for corresponding data items. The method also includes determining, for each of the attributes, overlapping matrices, representing overlapping ones of the corresponding measurements for each of the attributes. The method also includes generating samples of weights. Each of the samples of weights includes a corresponding weight for each of the overlapping matrices. The method also includes determining weighted overlap matrices by combining, for each of the samples of weights, a corresponding overlap matrix with the corresponding weight. The method also includes determining similarity matrices by combining, for each of the samples of weights, the weighted overlap matrices. The method also includes performing a clustering analysis on the similarity matrices to identify, for each of the samples of weights, corresponding desired groupings. Each of the corresponding desired groupings represents a corresponding group of the data items. The desired groupings across the similarity matrices are a set of groupings. The method also includes selecting a group from the set of groupings to obtain a selected grouping.

The one or more embodiments also provide for a system. The system includes a processor having a defined amount of processing resources; and a data repository in communication with the processor. The data repository stores attributes, each of the attributes representing corresponding measurements for corresponding data items. The data repository also stores overlapping matrices representing overlapping ones of the corresponding measurements for each of the attributes. The data repository also stores samples of weights. Each of the samples of weights includes a corresponding weight for each of the overlapping matrices. The data repository also stores weighted overlap matrices. The data repository also stores similarity matrices. The data repository also stores corresponding pluralities of groupings representing groupings of the data items taken from a corresponding similarity matrix in the similarity matrices. The data repository also stores a set of groupings representing the groupings across the similarity matrices. The data repository also stores a selected grouping selected from the set of groupings. The data repository also stores an overlapping matrix generator configured to determine the overlapping matrices. The system also includes a weight generator configured to generate the samples of weights. The system also includes a similarity matrix generator configured to determine the weighted overlap matrices by combining, for each of the samples of weights, a corresponding overlap matrix with the corresponding weight. The similarity matrix generator is further configured to determine the similarity matrices by combining, for each of the samples of weights, the weighted overlap matrices. The system also includes a group selector configured to perform a cluster analysis on the similarity matrices to identify, for each of the samples of weights, the corresponding pluralities of groupings. The group selector is also configured to select the selected grouping from the set of groupings. The group selector is also configured to report the selected grouping.

Other aspects of the invention will be apparent from the following description and the appended claims.

BRIEF DESCRIPTION OF DRAWINGS

FIG. 4, FIG. 5, FIG. 6, FIG. 7, FIG. 8, FIG. 9, and FIG. 10 show an example of minimizing computationally explosive group generation in computer systems with limited computing resources, in accordance with one or more embodiments of the invention.

DETAILED DESCRIPTION

Figure 1:
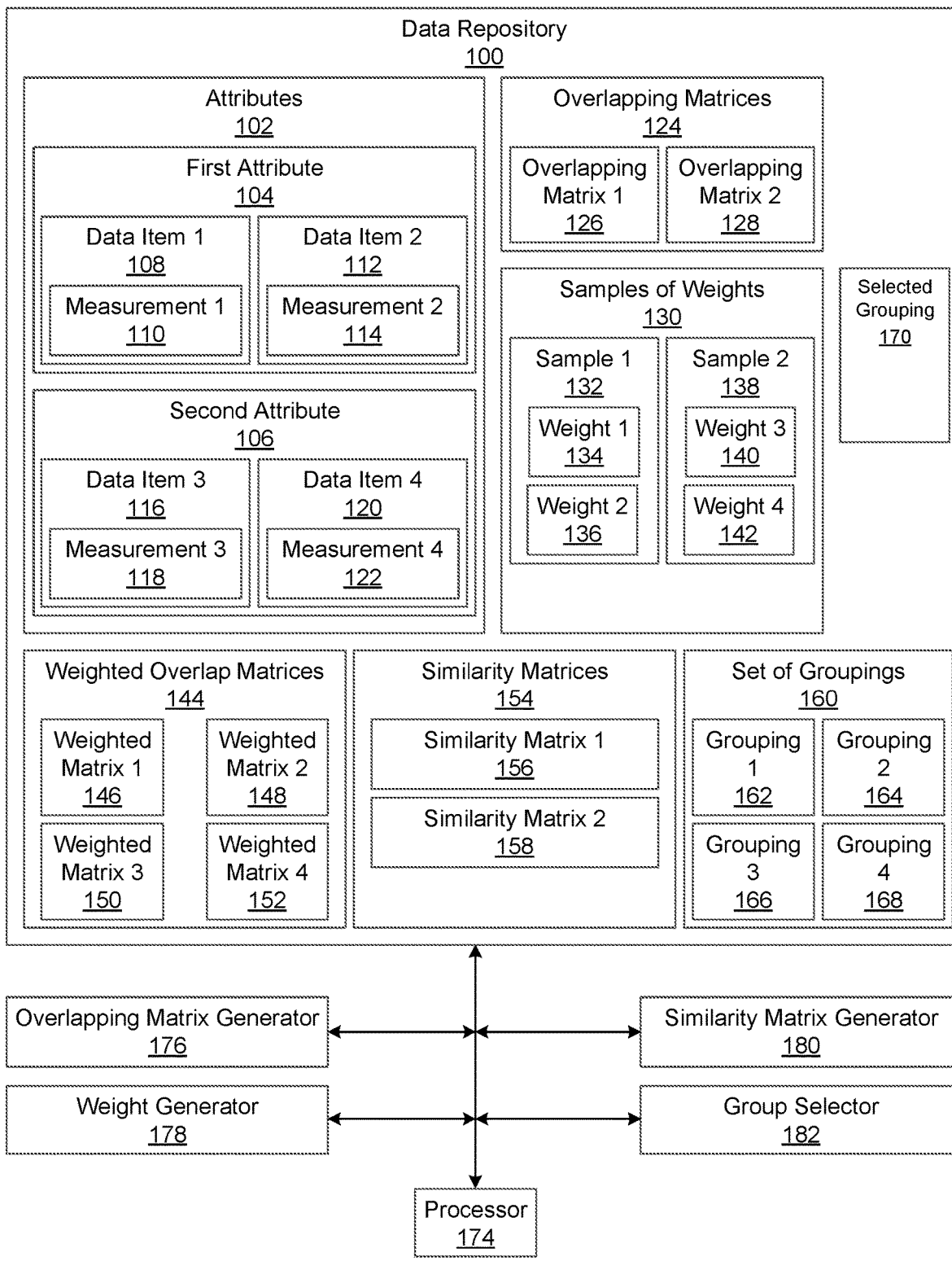
FIG. 1 shows a computing system, in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to minimizing computationally explosive group generation in computer systems with limited computing resources. The term "computationally explosive" is defined as a sufficient number of computations that available physical computing system resources cannot perform a desired algorithm within a time limit pre-determined to be acceptable.

In particular, the one or more embodiments are related to using a computer to recommend groups of data items from among many possible groups of data items. By way of an example, it may be desirable to identify teams of people based on well-defined metrics about the people. In the example, each person is a "data item" and each team is a "group." For example, overlapping shift times, physical work proximity, and information about the types of jobs worked by the people may be used to optimize which individual people should be assigned to particular teams. Note, however, that the same novel technique for organizing groups of data items may be applied to more than just an employment or project management context. The one or more embodiments may be used to recommend groups of animals when studying herds in certain biological studies. The one or more embodiments can also be used to identify groups of reactions, molecules, or atoms in chemistry or medical research. Thus, the one or more embodiments are not necessarily directed to an employment context, but rather are directed towards minimizing the computational explosion that can result when recommending groups of data items.

Stated differently, while the grouping recommendation technique described herein is effective at recommending groups based on underlying empirical data, a technical problem arises when recommending groups from underlying data. As indicated above, the technical problem is that directly comparing the underlying data to generate selected groupings is computationally explosive.

The one or more embodiments addresses this technical challenge through the use of a technique which bypasses a computationally explosive "brute force" approach, in which all possible calculations are performed. Instead, the one or more embodiments identify overlapping data in the underlying data sets, and then use that overlapping data to generate similarity matrices. The similarity matrices are then subjected to clustering and frequency analysis in order to identify a most commonly occurring set of groups. The most commonly occurring set of groups become the selected groupings for the data items.

In this manner, the one or more embodiments avoid the problems of a computational explosion by re-arranging and then clustering the underlying data in a manner which eliminates a large fraction of the total calculations that otherwise would be required to calculate the same recommend groups by a "brute force" method of directly comparing the data sets to each other. In other words, the one or more embodiments achieve a technical solution of improving the ability of a computer to perform a grouping recommendation algorithm in a manner which minimizes or avoids the problem of a computationally explosive set of calculations. In a sense, the one or more embodiments enable a computer to perform the desired group recommendation more rapidly.

Turning to the Figures, FIG. 1 shows a computing system, in accordance with one or more embodiments of the invention. The computing system includes a data repository (100). In one or more embodiments of the invention, the data repository (100) is a storage unit and/or device (e.g., a file system, a database, a collection of tables, or any other storage mechanism) for storing data. Further, the data repository (100) may include multiple different storage units and/or devices. The multiple different storage units and/or devices may or may not be of the same type and may or may not be located at the same physical site. The various objects stored in the data repository (100) may be established or received according to the methods described with respect to FIG. 2 and FIG. 3. A specific example of the use of the objects stored in the data repository (100) is shown with respect to FIG. 4 through FIG. 10.

The data repository (100) stores attributes (102), including first attribute (104) and second attribute (106). An attribute refers to a classification of a type of data. Specifically, as used herein, an "attribute" is a defined set of measurements for a defined set of data items. For example, referring to the example of FIG. 4 through FIG. 10, an attribute could be "shift time", "jobs worked," and "proximity of work." However, many other types of attributes (102) are contemplated for different embodiments, such as atomic weight for chemical grouping, patient outcome for medical grouping, etc.

In turn, as used herein, a "data item" is a person, object, or event for which measurements are taken. The same data item may be reflected in multiple attributes. For example, a "data item" could be the identity of a worker reflected in a "shift times" attribute. Concurrently, the same identity of the worker may also be reflected in a "jobs worked" attribute.

Finally, as used herein, a "measurement" is a specific data record for a data item. Continuing the above example, a "measurement" may be a number that reflects the amount of time the worker (i.e., the data item) worked for the shift (i.e., the attribute).

FIG. 1 shows such an arrangement of the terms defined above. For example, the first attribute (104) includes data item 1 (108) for which measurement 1 (110) is recorded. Similarly, the first attribute (104) also includes data item 2 (112) for which measurement 2 (114) is measured. Likewise, the second attribute (106) includes data item 3 (116) for which measurement 3 (118) is provided. Additionally, the second attribute (106) includes data item 4 (120) for which measurement 4 (122) is provided.

FIG. 1 only shows the relationships of the terms defined for "attribute," "data item," and "measurement." More or fewer objects may be present, though in an embodiment at least two attributes (i.e., the first attribute (104) and the second attribute (106)) are present. However, more or fewer data items and/or measurements may be present. Thus, for example, a given data item may have many measurements associated with the given data item.

Attention is now turned to the matrices described herein. As used herein, a "row" of a matrix is one axis of a matrix. Similarly, a "column" of a matrix is a second, different axis of the matrix. An "entry" of a matrix is a value entered at the intersection of a "row" and a "column." Another term for an "entry" of a matrix is a "cell."

Figures 6, 7:
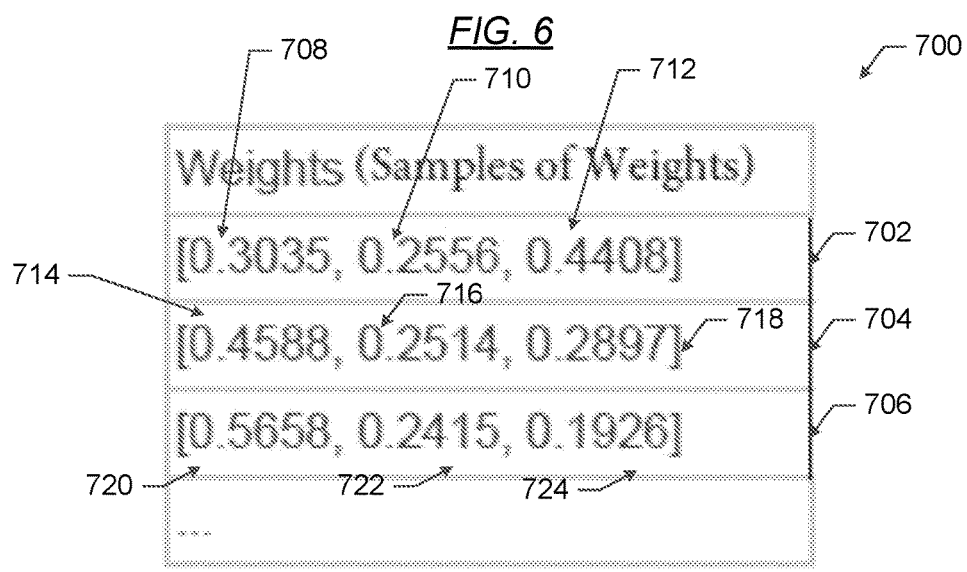

The data repository (100) also stores a number of overlapping matrices (124), such as overlapping matrix 1 (126) and overlapping matrix 2 (128). As used herein, an overlapping matrix is a matrix composed of data items along both the rows and columns of the matrix, for which entries in the overlapping matrix reflect a degree of overlap between two data items. In other words, both the rows and the columns of an overlapping matrix are the same data items of an attribute, and the entries of the overlapping matrix are numbers that reflect the degree of overlap between the respective data items in the corresponding row and column. Thus, each entry in the overlapping matrix is a value defining the degree of overlap between a data item represented by a row and a data item represented by a column. An example of the overlapping matrices (124), and hence overlapping matrix 1 (126) and overlapping matrix 2 (128), is shown in FIG. 6.

The number of overlapping matrices (124) will match the number of attributes (102) presented in a particular embodiment. Thus, the overlapping matrices (124) represent overlapping ones of corresponding measurements (i.e. measurement 1 (110), measurement 2 (114), measurement 3 (118), and measurement 4 (122)) for each of the attributes (i.e., first attribute (104) and second attribute (106)).

The data repository (100) also stores a number of samples of weights (130). As used herein, a "sample of weights" is a set of values between zero and one. An example of the samples of weights (130) is shown in FIG. 7. The number of possible samples in the samples of weights (130) is theoretically unlimited. However, in one or more embodiments, the number is large, such as 100, 1000, or even larger. Nevertheless, the number of values in a given sample is equal to the number of the attributes (102). Thus, each of the samples of weights (130) includes a corresponding weight for each of the overlapping matrices (124). In other words, a one to one mapping exists between the attributes (102) and the weights in each of the samples of weights (130).

In the example of FIG. 1, because the attributes (102) include two attributes, the first attribute (104) and the second attribute (106), each of the samples of weights (130) includes two weights. Sample 1 (132) includes weight 1 (134) and weight 2 (136). Likewise, sample 2 (138) includes weight 3 (140) and weight 4 (142). Note that the number of weights within each sample of the samples of weights (130) is also equal to the number of overlapping matrices (124). Thus, in the example of FIG. 1, there are two attributes (102), two overlapping matrices (124), and two weights within each of the samples of weights (130), though there may be a very large number of samples within the samples of weights (130) (i.e., 100 or greater).

The data repository (100) also stores a number of weighted overlapping matrices (144), including weighted matrix 1 (146), weighted matrix 2 (148), weighted matrix 3 (150), and weighted matrix 4 (152). As used herein, a "weighted overlapping matrix" is one of the overlapping matrices (124) which has been multiplied by one of the values in the samples of weights (130). Thus, a weighted overlapping matrix also has the data items for both the rows and columns, though the entries of the weighted overlapping matrix are multiplied by a corresponding weight from the samples of weights.

An example of a weighted overlapping matrix is shown in FIG. 8. Note that because there may be many instances of the samples of weights (130), there may be many weighted overlapping matrices (144). In particular, there will be as many instances of the weighted overlapping matrices (144) as there are instances of the samples of weights (130) times the number of attributes. FIG. 1 only refers to four weighted overlapping matrices (144) for the sake of clarity. Accordingly, the number of calculations to be performed during a grouping algorithm could quickly become computationally explosive.

The data repository (100) also stores a number of similarity matrices (154), including similarity matrix 1 (156) and similarity matrix 2 (158). As used herein, a "similarity matrix" is defined as a sum, or other combination, of the weighted overlapping matrices (144) for a given sample of weights within the samples of weights (130). Thus, there is one similarity matrix for each of the samples of weights (130).

Thus, the rows and columns of the similarity matrices are also the data items, and the entries of the similarity matrices are the sum or other combination of values of corresponding entries in the weighted overlapping matrices. Examples of the similarity matrices (154) are shown in FIG. 9.

The data repository (100) also stores a set of groupings (160), including grouping 1 (162), grouping 2 (164), grouping 3 (166), and grouping 4 (168). As used herein, a "grouping" is a set of group(s) to which data items belong within a similarity matrix, such as similarity matrix (154).

Thus, for example, grouping 1 (162) and grouping 2 (164) may be taken from similarity matrix 1 (156). Together, grouping 1 (162) and grouping 2 (164) may be termed a "corresponding plurality of groupings" because the two grouping are derived from a single similarity matrix (i.e., similarity matrix 1 (156)). It is contemplated that there are multiple "corresponding pluralities of groupings." For example, grouping 3 (166) and grouping 4 (168) may be taken from similarity matrix 2 (158) and be termed another "corresponding plurality of groupings," this time taken from similarity matrix 2 (158). Again, together, the "corresponding plurality of groupings" across the similarity matrices may be termed the set of groupings (160).

Figure 10:
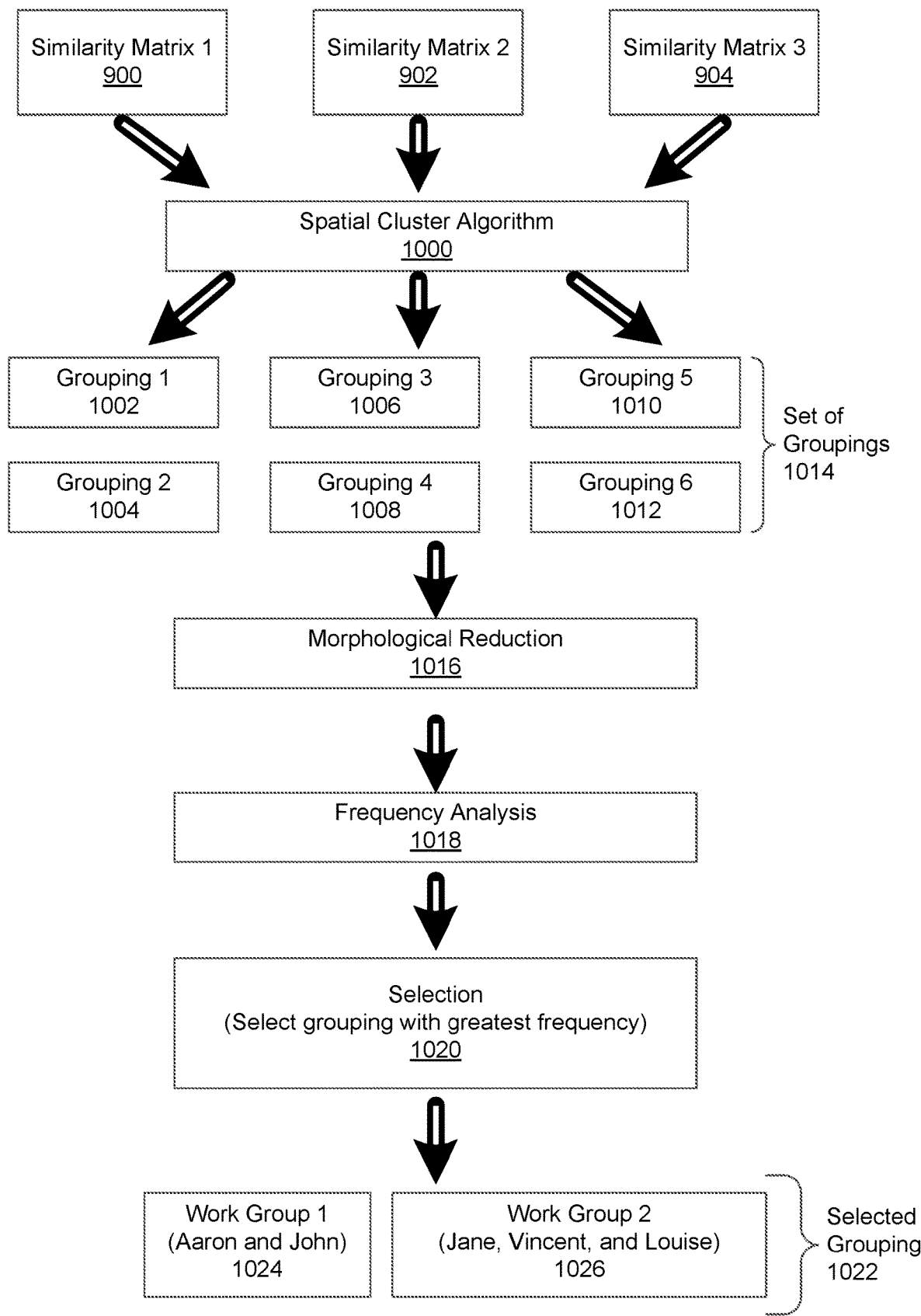

Because the similarity matrices (154) are ultimately based on the measurements of the data items of the attributes (102), the set of groupings (160) represents groups of the data items based on the attributes (102). An example of a set of groupings is shown in FIG. 10.

The data repository (100) also stores a selected grouping (170). The selected grouping (170) is selected from among the set of groupings (160). The basis for choosing the selected grouping (170) is described with respect to FIG. 2, FIG. 3, and FIG. 10.

Thus, a "selected grouping" is defined as a single group of data items that is selected to be the recommended, or winning, grouping of data items among all possible groupings of data items that were considered (i.e., the set of groupings (160)). Note that the selected grouping (170) may be characterized as two or more data items that are recommended as belonging together in a group. An example of the selected grouping (170) is shown in FIG. 10. Selection of the selected grouping (170) is described with respect to FIG. 2, FIG. 3, and FIG. 10.

The system shown in FIG. 1 may include other features. For example, the system shown in FIG. 1 may include a processor (174). The processor (174) may be one or more physical computer processors, in a possibly distributed environment, as described with respect to FIG. 11A and FIG. 11B. The processor (174) has a defined amount of processing resources. A "processing resource" is defined as a quantitative assessment of a processor's performance, such as clock rate, bus speed, frequency, etc. Thus, the processor (174) requires a definitive amount of time to execute any set of commands called for in an executable algorithm.

The system shown in FIG. 1 may also include an overlapping matrix generator (176). The overlapping matrix generator (176) is configured to determine the overlapping matrices (124). The overlapping matrix generator (176) may be software executed by the processor (174), or may be a special purpose processor configured to generate the overlapping matrices (124), as described with respect to FIG. 2, FIG. 3, or FIG. 6.

The system shown in FIG. 1 also includes a weight generator (178). The weight generator (178) is configured to generate the samples of weights (130). The weight generator (178) may be software executed by the processor (174), or may be a special purpose processor configured to generate the samples of weights (130), as described with respect to FIG. 2, FIG. 3, or FIG. 7.

The system shown in FIG. 1 also includes a similarity matrix generator (180). The similarity matrix generator (180) is configured to determine the weighted overlapping matrices (144) by combining, for each of the samples of weights (130), the corresponding overlap matrix with the corresponding weight. The similarity matrix generator (180) is also configured to determine the similarity matrices (154) by combining, for each of the samples of weights (130), the weighted overlap matrices (144). The similarity matrix generator (180) may be software executed by the processor (174), or may be a special purpose processor configured to generate the similarity matrices (154), as described with respect to FIG. 2, FIG. 3, or FIG. 9.

The system shown in FIG. 1 also includes a group selector (182). The group selector (182) is configured to perform a cluster analysis on the similarity matrices (154) to identify, for each of the samples of weights (130), the corresponding pluralities of groupings. The group selector (182) is also configured to select the selected grouping (170) from the set of groupings (160), and report the selected grouping (160). As used herein "reporting" refers to displaying on a computer display, storing in a non-transitory computer readable storage medium, etc. The procedures for performing these functions are described with respect to FIG. 2, FIG. 3, or FIG. 10.

While FIG. 1 shows a configuration of components, other configurations may be used without departing from the scope of the invention. For example, various components may be combined to create a single component. As another example, the functionality performed by a single component may be performed by two or more components.

Figure 2:
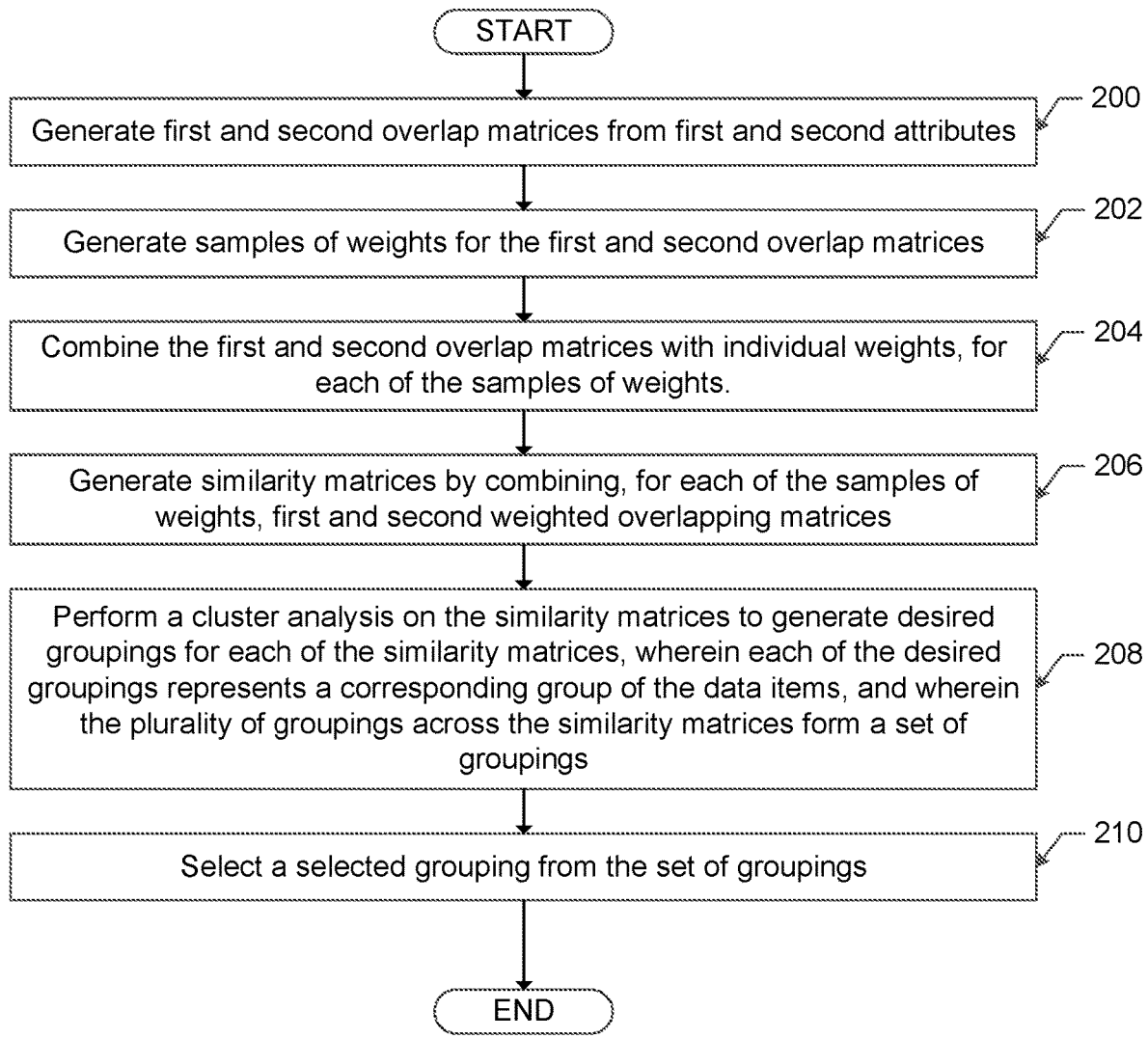
FIG. 2 and FIG. 3 show computer-implemented methods, in accordance with one or more embodiments of the invention.
Figure 3:
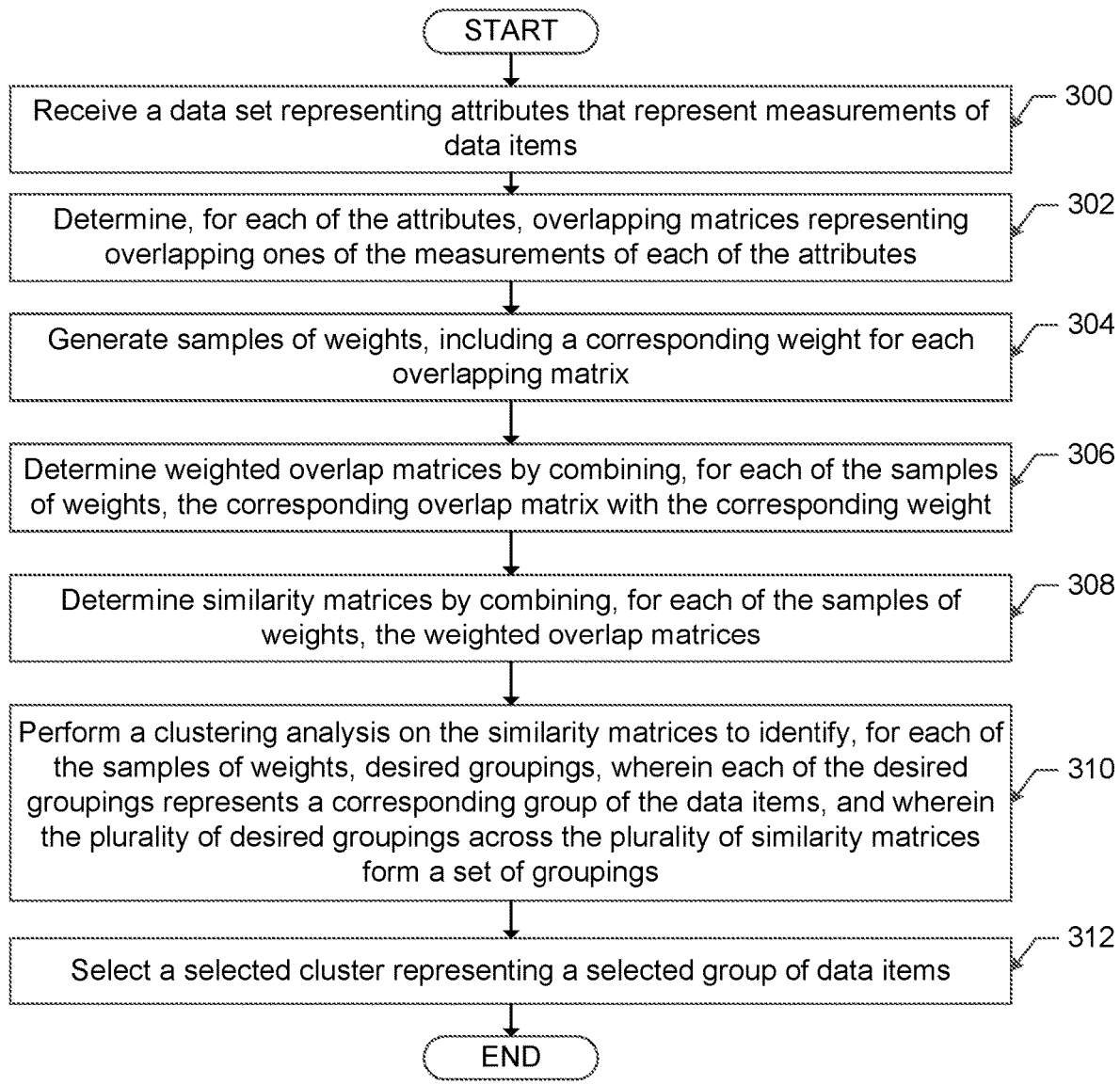

FIG. 2 and FIG. 3 are flowcharts for minimizing computationally explosive group generation in computer systems with limited computing resources, in accordance with one or more embodiments. The methods shown in FIG. 2 and FIG. 3 are considered variants of each other. The methods shown in FIG. 2 and FIG. 3 may be executed using the system shown in FIG. 1. Note that FIG. 4 through FIG. 10 illustrate another variation of the methods described with respect to FIG. 2 and FIG. 3.

At step 200, first and second overlap matrices are generated from first and second attributes. Thus, an overlap matrix is generated for each of the attributes. An overlap matrix may be generated by arranging the data items along both the rows and columns of a matrix. The degree of overlap between any two of the data items is then calculated and reflected in a corresponding entry of the overlap matrix.

Thus, for example, assume there are two data items in an attribute: Bob and Jane. The measurements for Bob and Jane are the shift hours they worked. Bob will perfectly overlap with Bob's own shift times, and thus a "1" will be recorded for the intersection of the column for Bob and the row for Bob. Assume Bob and Jane were working shifts that put them working concurrently 50% of the time. In this case, the entries for the intersection rows and columns for Bob and Jane would be 0.5. An example of an overlapping matrix is shown with respect to FIG. 6. Note, however, that the overlapping matrix need not be related to shift times, as indicated above with respect to FIG. 1 and also below with respect to FIG. 6.

At step 202, samples of weights are generated for the first and second overlap matrices. The samples of weights may be generated using the Muller method for multi-dimensional spaces. The Muller method is an efficient method to compute a uniform distribution of weights where the degree of polynomial will be equal to the number of attributes. Note that many samples of weights will be generated.

In an embodiment, for each of the plurality of samples of weights, a sum of weights within a sample equals one. In this manner, it is possible to ensure that the ultimately resulting similarity matrices have entry values between zero and one. Ensuring that the similarity matrices have entry values between zero and one further reduces the total amount of numbers that will be manipulated by the processor, thereby further mitigating the problem of a computationally explosive operation.

Attention is now turned to determining how many samples of weights are to be generated at step 202. To generate a recommendation for an optimum grouping of data items, multiple weights are generated in order to compute a winning group (i.e., the selected grouping (170) in FIG. 1). If only one sample of weights were generated, only one recommended group would be generated. Therefore, to generate confidence in the recommended grouping of data items, several weight samples are taken in order to pick the grouping recommendation that occurs most frequently. Note, also, that if there were only one attribute, only one recommended grouping can be generated. Thus, it is preferred that at least two attributes are used.

The number of samples of weights depends on the number of attributes. The number of samples of weights to be generated is about ten raised to the power of one less than the number of attributes. In other words, the number of samples of weights is $S=10^{k-1}$, where S is the number of samples of weights, and k is the number of attributes. Thus, if three attributes are present, 100 samples of weights will be generated, resulting (as described below) in 100 weighted overlap matrices, each of which will be further processed and combined. If four attributes are used, then 1000 samples of weights and weighted overlap matrices will result, if five attributes are used, then 10,000 samples of weights and weighted overlap matrices will result, and so on. Accordingly, a first number of the samples of weights is exponentially greater than a second number of the attributes.

The order of magnitudes in the number of samples of weights statistically results in a reliable selected grouping of data items. Thus, the number of computations involved could become computationally explosive rapidly with the number of attributes being used. Depending on the computer system and the number of data items and the number of measurements for each data item, selecting even two attributes may result in a potentially computationally explosive situation.

Directly computing groups from the weighted overlap matrixes would be computationally explosive. Thus, the remaining steps in the method of FIG. 2 avoid the computationally explosive situation by minimizing the number of computations needed to select the recommended grouping(s) of the data items.

In particular, at step 204, the method includes combining, for each of the plurality of samples of weights, the first overlap matrix with the corresponding first weight and the second overlap matrix with the corresponding second weight. Combining may be achieved by multiplying each instance within a sample of weights with the corresponding overlap matrix. For example, the first instance in a given sample of weights is multiplied by the first overlap matrix, the second instance in the given sample of weights is multiplied by the second overlap matrix, and so on. An example of this operation is shown in FIG. 8.

At step 206, similarity matrices are generated by combining, for each of the samples of weights, a weighted first overlap matrix with a weighted second overlap matrix. For example, the weighted overlap matrices corresponding to the first and second attributes may be added together, resulting in a similarity matrix. The combination may be through matrix addition, which is the operation of adding two matrices by adding the corresponding entries together. Other methods for combining similarity matrices may be used. An example of this operation is shown in FIG. 9.

At step 208, a cluster analysis is performed on the similarity matrices to generate desired groupings for each of the similarity matrices. Each of the desired groupings represents a corresponding group of the data items. The plurality of groupings across the similarity matrices form a set of groupings. Each of the similarity matrices is subjected to clustering analysis using a spatial clustering technique, as described further below. The cluster analysis will reduce the number of calculations to be performed, since similarity matrices outside of the most frequent cluster need not be analyzed for groupings of data items.

Attention is now turned to how the cluster analysis is performed on the similarity matrices. The similarity matrices are used as inputs into a clustering algorithm, which may be spectral clustering, density-based spatial clustering of applications with noise (DBSCAN), or possibly another clustering method. However, an example is given with respect to the spectral clustering method.

The spectral clustering algorithm takes a similarity matrix as an input, along with the number of desired groups to be generated, and creates a vector of group assignments where the index of the vector denotes an employee. In the context of a crew grouping example, the input and output of the clustering algorithm can be expressed as equation (1) below:

$$[W_1, W_2, W_3, \ldots, W_M] = \text{SPECTRAL}(K, S_{M \times M}) \quad (1)$$

Where $W_i$ represents a workers potential cluster assignments, M is the number of users to cluster, K is the number of groups (clusters) to create, and S is a M×M similarity matrix. Eigenvectors are used to see which workers are similar to each other. The, a K-Nearest Neighbors (KNN) technique is used to cluster on those workers. Here, K is the number of groups in the KNN algorithm, in the formula above K is input by a computer technician. The distance used in the KNN part of spectral clustering comes from the computed eigenvectors of the similarity matrix.

The result of the cluster analysis on the similarity matrices is multiple groupings or "clusters" (i.e., each grouping or cluster is a candidate grouping of workers) for each similarity matrix. Overall, the entire set of all groupings across all similarity matrices is the "set of groupings" from which the final selected (i.e. "winning") grouping of workers is selected. The selection of the selected grouping of workers is performed using frequency analysis, as described with respect to step 210, below.

It is possible that a user generating the groupings only desires a fixed number of groupings for the set of groupings. Therefore, as an input to the clustering algorithm, the number of clusters to be generated may be provided by the user. In a similar manner, a maximum group size can also be input to the clustering algorithm.

For instance, a worker crew recommender system will compute groupings based on a desired number of groupings provided by a system administrator. For a company of 100 workers that desires 5 different crews for daily operations, the administrator can select 5 groups. Varying or equal sized groups can be achieved with varying clustering techniques, such as the spatial clustering technique or another clustering technique.

At step 210, a grouping is selected from the set of groupings to obtain a selected grouping. The selected grouping may be selected by performing a frequency analysis on the set of groupings. The most frequently occurring grouping(s) is the selected grouping(s). In one embodiment, the method of FIG. 2 may terminate thereafter.

Attention is now turned to one specific technique for performing the frequency analysis. To perform the frequency analysis, morphologically identical groupings are identified, particularly when the clustering algorithm used is unstructured. For example, clustering a team of 5 into 2 groups could yield the following equivalent groupings: [1, 1, 2, 2, 2] and [2, 2, 1, 1, 1], where each entry indicates a grouping of data items. In this example, [1, 1, 2, 2, 2] and [2, 2, 1, 1, 1] are morphologically identical because [1, 1, 2, 2, 2,] and [2, 2, 1, 1, 1] are same with labels reversed between the two groupings. Labels for the data items therefore are standardized such that any morphologically identical groupings are counted as such, reducing the total number of groupings. Once the morphologically identical groupings are identified, a frequency measure for each grouping result can be used to identify the most frequent grouping. Then, as indicated above, the selected grouping of data items may be determined from the most frequent grouping of similarity matrices.

Another example of the frequency analysis at step 210 is now presented. Because clustering at step 208 is unstructured when the clusters (i.e., recommended groupings) of the workers are generated based on the similarity matrices, there will be $10^{(k-1)}$ computed clusters/groupings for the $10^{(k-1)}$ similarity matrices provided. Also because clustering algorithms are unstructured, the set of groupings are processed before being reported, such as for display to a user.

For example if 5 users are being split into 2 clusters and there are 8 similarity matrices, the following results are possible. Each vector below is computed by the clustering algorithm (spectral clustering in this case). A cluster number is assigned to each user, since K=2 in this scenario (2 groups to be assigned). Thus, a worker gets a label of 1 or 2 to denote in which group a worker was clustered.

The example clusters (i.e. groupings) may be, for example:

[1,1,1,2,2],[2,2,2,1,1],[2,2,2,1,1],[1,1,2,2,2],[2,2,1,1,1],[1,1,1,2,2],[1,2,2,2,2],[1,2,2,2,2]

While there appear to be 5 clusters (i.e. groupings) generated, in truth there are only 3 morphologically unique clusters/groupings. Clusters/groupings that are morphologically identical, are consolidated, thereby reducing further calculations. In this case, clusters/groupings [1, 1, 1, 2, 2] and [2, 2, 2, 1, 1] are morphologically identical, and thus are consolidated. The unique clusters/groupings that remain are:

[1,1,1,2,2],[1,1,2,2,2], and [1,2,2,2,2]. (Set 1)

The three unique clusters/groupings in Set 1 (which were drawn from the 8 unique similarity matrices) are then run through the spectral clustering algorithm. The cluster [1, 1, 1, 2, 2] appeared 2 times in the above example and the identical cluster [2, 2, 2, 1, 1] appeared 2 times as well. When the clusters/groupings are consolidated a tally is kept of the frequency of unique morphological clusters/groupings such that the final cluster/grouping, [1, 1, 1, 2, 2], has a frequency of "4," compared to the other two unique clusters/groupings which only had a frequency of "2" apiece. Being the most frequent grouping, the final cluster/grouping of [1, 1, 1, 2, 2] becomes the selected grouping. The workers are then re-associated with the group labels so that a user sees, reported, groups of workers. In other words, [1, 1, 1, 2, 2] means that employees 1 through 3 are assigned to group 1 and employees 4 and 5 are assigned to group 2. An example is shown in FIG. 10.

Multiple groupings may also be presented to the user. Thus, for example, not just the final cluster/grouping may be presented to the user. When cluster/group recommendations are reported, the most frequently occurring cluster is presented first. In the example above, the cluster [1, 1, 1, 2, 2] would be presented first, followed by the next two most frequent groupings.

Note that if all clusters/groupings are unique, (i.e., there is no most frequent cluster/grouping), the weight scheme may be changed. In this case, the process of generating the weighted overlap matrices, the similarity matrices, and the clustering may be re-executed in order to generate groupings with at least two similar similarity matrices. Stated differently, the method may include determining that all groupings in the set of groupings are unique; generating a new plurality of samples of weights, each having a corresponding third weight and a corresponding fourth weight; and selecting a new selected grouping. The new grouping is selected by: combining, for each of the new plurality of samples of weights, the first overlap matrix with the corresponding third weight and the second overlap matrix with the corresponding fourth weight; generating a second plurality of similarity matrices by combining, for each of the new plurality of samples of weights, a weighted third overlap matrix with a weighted fourth overlap matrix; performing clustering on the second plurality of similarity matrices to generate a second corresponding plurality of groupings for each of the second plurality of similarity matrices, wherein each of the second plurality of groupings represents a corresponding group of the data items, and wherein together all second groupings are a second set of groupings; and selecting a second group from the second plurality of groups to obtain a second selected grouping.

In an embodiment, for future recommendations using similar attributes and/or similar data items for a different measurement set, the sample of weights corresponding to the selected grouping may be stored. In this case, when a new request to generate a new selected grouping is received, the stored sample of weights may be used as a center point for a new set of samples of weights. In this manner, fewer samples of weights may be used, perhaps by an order of magnitude less, thereby further reducing the number of calculations to be used to determine the new selected grouping according to the procedure set forth above.

Attention is now turned to FIG. 3. The method of FIG. 3 is a variation of the method shown in FIG. 2, and may be implemented using the system shown in FIG. 1.

At step 300, a data set is received. The data set represents information regarding attributes, and each of the attributes represents corresponding measurements for corresponding data items. The data set may be received at a processor. The data set may be retrieved from a data repository, or may be collated or otherwise gathered from multiple data sources storing data regarding the data items.

At step 302, the method includes determining, for each of the attributes, overlapping matrices. The overlapping matrices represent overlapping ones of the corresponding measurements for each of the attributes. The overlapping matrices may be generated as described with respect to step 200 of FIG. 2.

At step 304, samples of weights are generated, where each of the samples of weights includes a corresponding weight for each of the overlapping matrices. The samples of weights may be generated as described with respect to step 202 of FIG. 2.

At step 306, weighted overlap matrices are determined by combining, for each of the samples of weights, the corresponding overlap matrix with the corresponding weight. The overlap matrices may be combined with the samples of weights as described with respect to step 204 of FIG. 2.

At step 308, similarity matrices are determined by combining, for each of the samples of weights, the weighted overlap matrices. In other words, the weighted overlap matrices for a given sample of weights is combined, such as by matrix addition, as described with respect to step 206 of FIG. 2.

At step 310, a clustering analysis is performed on the similarity matrices to identify, for each of the samples of weights, desired groupings, wherein each of the desired groupings represents a corresponding group of the plurality of data items, and wherein together all groupings form a set of groupings. The cluster analysis may be performed as described with respect to step 208 of FIG. 2.

At step 312, a grouping is selected from the set of groupings to obtain a selected grouping. Selection may be performed as described with respect to step 210 of FIG. 2. As described above, more than one selected grouping may be reported. Each group is a combination of data items that optimize combinations of data items with respect to the set of attributes, given the measurements for the data items.

In one embodiment, the method of FIG. 3 may terminate thereafter. However, the method of FIG. 3 may be varied in a manner similar to the variations to the method of FIG. 2, as described above.

While the various steps in the flowcharts of FIG. 2 and FIG. 3 are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 4 through FIG. 10 present a specific example of the techniques described above with respect to FIG. 1 through FIG. 3. FIG. 4 through FIG. 10 use, in some cases, common reference numerals that refer to common objects. The example of FIG. 4 through FIG. 10 is for explanatory purposes only and not intended to limit the scope of the invention. Thus, while the example of FIG. 4 through FIG. 10 takes the form of forming recommendations for grouping employees in a company, the example does not limit other embodiments in which computationally explosive group generation is also minimized in computer systems with limited computing resources.

FIG. 4 shows an example of three attributes, for which one of the attributes has been expanded to show the data items and measurements for the data items. Thus, FIG. 4 shows an example of the relationships between attributes, data items, and measurements.

In particular, FIG. 4 shows three attributes: Attribute 1 (400), Attribute 2 (402), and Attribute 3 (404). Attribute 1 (400) relates to shift times worked by employees of the company. In other words, Attribute 1 (400) is data reflecting when employees began work and ended work. Attribute 2 (402) relates to jobs worked by the employees of the company. For example, one employee may work on one project, whereas another employee may work on another project. The two projects may or may not be related to each other. Attribute 3 (404) relates to the proximity of work. For example, two of the employees may work at job site 1, but three other employees may work at job site 2. However, the location of work may also relate to the physical proximity of employees at a single worksite. Together, Attribute 1 (400), Attribute 2 (402), and Attribute 3 (404) form a complete data set for the example of FIG. 4.

In the embodiment of FIG. 4, the data items and measurements recorded for Attribute 1 (400) are shown. In this example, the data items are the workers (406): Jane, John, Vincent, Louise, and Aaron. The ellipsis in the workers (406) column indicate that many other workers are present.

The measurements include two measurements per worker. Measurement 1 (408) reflects the start time of a worker's shift and measurement 2 (410) reflects the end time of a worker's shift. Additional measurements may be included for a 24 hour period, such as when a worker leaves for a break and then comes back. Still other measurements may be included, such as a record of a worker's start and end times for a week, a month, a year, or some other desirable time period. Again, the ellipsis in measurement 1 (408) and measurement 2 (410) indicate that the start and end times for many other workers may be recorded.

For the sake of clarity, the data items and the measurements are not shown for Attribute 2 (402) (jobs worked) and Attribute 3 (404) (proximity of work). However, the data items for Attribute 2 (402) and Attribute 3 (404) are the same; i.e., the data items are the workers. The measurements for the Attribute 2 (402) and the Attribute 3 (404) are quantifiably defined measurements of the jobs worked and the proximity of work, respectively.

Attention is now turned to FIG. 5. FIG. 5 shows an intermediate step towards the determination of the overlap matrices. In particular, FIG. 5 shows a determination of a degree of overlap in the measurements for Attribute 1 (400) (i.e., the degree of overlap between shift times between any two workers). Thus, table (500) compares the shift times for a base worker (502) relative to a compared worker (504) for a particular day of the week (506) and shows the percentage overlap (508) in shift times. The percentage overlap (508) can then be used to generate an overlap matrix for the table (500), as shown in FIG. 6. Similar overlap tables are generated for the Attribute 2 (402) and the Attribute 3 (404).

FIG. 6 shows the three overlap matrices formed after determining the overlap data as shown in FIG. 5. Thus, FIG. 6 shows overlap matrix 1 (600) (overlap data for shift times), overlap matrix 2 (602) (overlap data for jobs worked), and overlap matrix 3 (604) (overlap data for the proximity of work). In overlap matrix 1 (600), the data items (the names of the workers) are arranged in both rows and columns. Note that a given worker overlaps in shift times with himself or herself perfectly (i.e., a value of 1) because a worker shares a complete overlap in timed worked with herself or himself. For example, Vincent's shift times always overlaps perfectly with Vincent's shift times, and thus the "Vincent-Vincent" entry equals one. The remaining numbers are less than one, in this example only, because in this example no worker shares the exact same shift times worked with a different worker. Thus, for example, the "Vincent-John" entry is equal to 0.6, indicating a 60% overlap in the times worked by Vincent and John. The ellipsis shown in overlap matrix 1 (600) show that many more workers may be compared.

Overlap matrix 2 (602) and overlap matrix 3 (604) have a similar structure as overlap matrix 1 (600). Thus, for example, overlap matrix 2 (602) shows the degree of overlap between the jobs worked among the workers. Similarly, overlap matrix 3 (604) shows the degree of overlap for the physical distances between workers or the job sites at which the workers are present. However, for the sake of clarity, the details of overlap matrix 2 (602) and overlap matrix 3 (604) are not shown.

FIG. 7 shows an example of samples of weights (700). Specifically, FIG. 7 shows three samples of weights, sample of weights 1 (702), sample of weights 2 (704), and sample of weights 3 (706). Each of the samples of weights (700) includes one weight for each attribute. Thus, each of sample of weights 1 (702), sample of weights 2 (704), and sample of weights 3 (706) have three weights. The samples of weights (700) may be generated as random numbers, though the Muller technique described above may be used such that the total of all three weights within a given sample of weights is less than or equal to one.

Attention is drawn specifically to the sample of weights 1 (702). The sample of weights 1 (702) includes a first weight (708), a second weight (710), and a third weight (712). In the course of generating the weighted overlap matrices shown in FIG. 8, the first weight (708) will be multiplied by each of the entry values in the overlap matrix 1 (600). Similarly, the second weight (710) will be multiplied by each of the entry values in the overlap matrix 2 (602), and the third weight (712) will be multiplied by each of the entry values in the overlap matrix 3 (604).

A similar procedure will be conducted for the sample of weights 2 (704) and the sample of weights 3 (706), and any other samples of weights. Thus, fourth weight (714), fifth weight (716), and sixth weight (718) in the sample of weights 2 (704) will be multiplied in a similar manner by the three overlap matrices shown in FIG. 6 to form a second weighted overlapping matrix. Likewise, seventh weight (720), eighth weight (722), and ninth weight (724) will be multiplied in a similar manner by the three overlap matrices shown in FIG. 6 to form a third overlapping matrix. In this embodiment, because three attributes are used, the ellipsis in FIG. 7 indicate that there are a total of 100 instances in the samples of weights (700). For this reason, 100 total weighted overlapping matrices will be formed.

FIG. 8 shows a visual representation of the procedure for generating the weighted overlap matrices described with respect to FIG. 7. Thus, for example, the overlap matrix 1 (600) is multiplied by first weight (708) in the sample of weights 1 (702) to generate weighted overlap matrix 1 (800). Similarly, the overlap matrix 2 (602) is multiplied by the second weight (710) in the sample of weights 1 (702) to generate weighted overlap matrix 2 (802). Likewise, the overlap matrix 3 (604) is multiplied by the third weight (712) to generate the weighted overlap matrix 3 (804).

A similar procedure is followed with respect to the sample of weights 2 (704) and the sample of weights 3 (706). Thus, the weighted overlap matrix 4 (806) is generated by multiplying the overlap matrix 1 (600) by the fourth weight (714). The weighted overlap matrix 5 (808) is generated by multiplying the overlap matrix 2 (602) by the fifth weight (716). The weighted overlap matrix 6 (810) is generated by multiplying the overlap matrix 3 (604) by the sixth weight (718). Likewise, the weighted overlap matrix 7 (812) is generated by multiplying the overlap matrix 1 (600) by the seventh weight (720). The weighted overlap matrix 8 (814) is generated by multiplying the overlap matrix 2 (602) by the eighth weight (722). The weighted overlap matrix 9 (816) is generated by multiplying the overlap matrix 3 (604) by the ninth weight (724).

The ellipsis (818) indicates that a similar procedure is followed for every additional sample of weights in the samples of weights (700). Thus, as can be seen, a potentially computationally explosive number of calculations could be performed.

FIG. 9 shows generation of the similarity matrices described above. In particular, the similarity matrices are formed by combining each of the weighted overlap matrices associated with a given sample of weights. In this particular example, the weighted overlap matrices for each of the three attributes are added together for a given sample of weights.

Thus, as shown in FIG. 9, similarity matrix 1 (900) is generated by adding together weighted overlap matrix 1 (800), weighted overlap matrix 2 (802), and weighted overlap matrix 3 (804). Similarly, similarity matrix 2 (902) is generated by adding together weighted overlap matrix 4 (806), the weighted overlap matrix 5 (808), and the weighted overlap matrix 6 (810). Likewise, the similarity matrix 3 (904) is generated by adding together the weighted overlap matrix 7 (812), the weighted overlap matrix 8 (814), and the weighted overlap matrix 9 (816).

The samples of weights (700) were all generated to have values such that when the weighted overlap matrices are added together, the final similarity matrix has values between 0 and 1 for each of the data items in the similarity matrix. In this manner, the number of digits that will be processed in the following step may be reduced to further mitigate the problem of a computationally explosive algorithm.

Attention is now turned to FIG. 10. FIG. 10 shows the process of reporting selected groupings of workers that optimize overlapping of shift times, jobs worked, and proximity of work. First, a spatial clustering algorithm (1000) is applied to the set of similarity matrices (similarity matrix 1 (900), similarity matrix 2 (902), and similarity matrix 3 (904)) to generate a set of groupings (1014). The spatial clustering algorithm (1000) operates in a manner described with respect to FIG. 2.

In the example of FIG. 10, when the spatial clustering algorithm (1000) is applied to the similarity matrix 1 (900), Grouping 1 (1002) and Grouping 2 (1004) result. Similarly, when the spatial clustering algorithm (1000) is applied to the similarity matrix 2 (902), Grouping 3 (1006) and Grouping 4 (1008) result. Likewise, when the spatial clustering algorithm (1000) is applied to the similarity matrix 3 (904), Grouping 5 (1010) and Grouping 6 (1012) result.

Thus, the Grouping 1 (1002) and the Grouping 2 (1004) form a first plurality of groupings. Similarly, the Grouping 3 (1006) and the Grouping 4 (1008) form a second plurality of groupings, and the Grouping 5 (1010) and the attributes (102) form a third plurality of groupings. Together, the first, second, and third pluralities of groupings form the set of groupings 1014.

A morphological reduction (1016) is then applied to the set of groupings 1014. The morphological reduction (1016) eliminates morphologically identical groupings from the set of groupings 1014, thereby mitigating in part issues of subsequent computational explosion that may arise.

A frequency analysis (1018) is then applied to the set of groupings (1014) after the morphological reduction (1016). The process of applying the frequency analysis (1018) is described further with respect to FIG. 2. In this example, the Grouping 3 (1006), corresponding to Aaron and John being in one work group and Jane, Vincent, and Louise being in another working group, is the most frequently occurring grouping among the set of groupings 1014, after the morphological reduction (1016). Note that when the number of data items grows and the number of groups to be formed grows, then the frequency analysis (1018) may not be straightforward to recognize.

In any case, a selection (1020) is made of the grouping that occurs with the greatest frequency. A result of the selection (1020) is the selected grouping (1022). The selected grouping (1022) contains the workers (i.e., data items) that constitute the work groups that have the most overall attributes in common relative to the shift times, jobs worked, and the proximity of work. In other words, the data items (i.e. the workers) are presented as a set of work groups, where each work group is optimized with respect to shift times, jobs worked, and the proximity of work.

In the example of FIG. 10, the selected grouping (1022) is that Aaron and John are in Work Group 1 (1024) and that Jane, Vincent, and Louise are in Work Group 2 (1026). Thus, if the user of the grouping software desires to sort the five workers into two working groups based on shift times, jobs worked, and proximity of work, then the optimal way to arrange the workers to most efficiently overlap the combination of shift times, jobs worked, and the proximity of work is to place Aaron and John into Work Group 1 (1024) and to place Jane, Vincent, and Louise into Work Group 2 (1026).

Note that the example of FIG. 10 is simple for the sake of clarity. However, in a large organization where there are 50,000 workers that should be sorted into 1,500 working groups based on 6 attributes, each attribute with ten measurements per worker, and a total of $10^{(6-1)}=100,000$ samples of weights, the algorithm can become computationally explosive. The techniques described herein mitigate the potential for a computationally explosive grouping algorithm by one or more of clustering, morphological reduction, and frequency analysis.

Figure 11A:
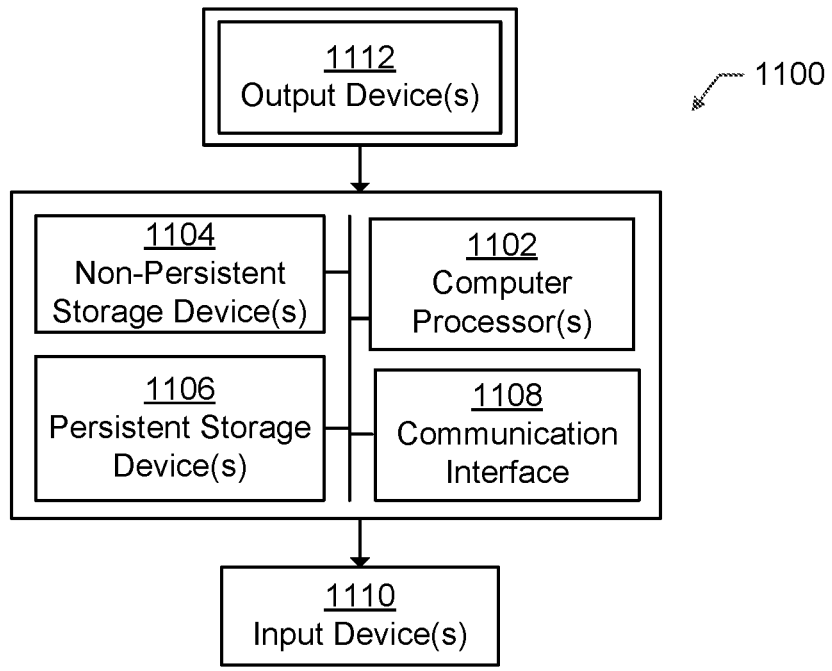
FIG. 11A and FIG. 11B show an example of a computing system and network environment, in accordance with one or more embodiments of the invention.
Figure 11B:
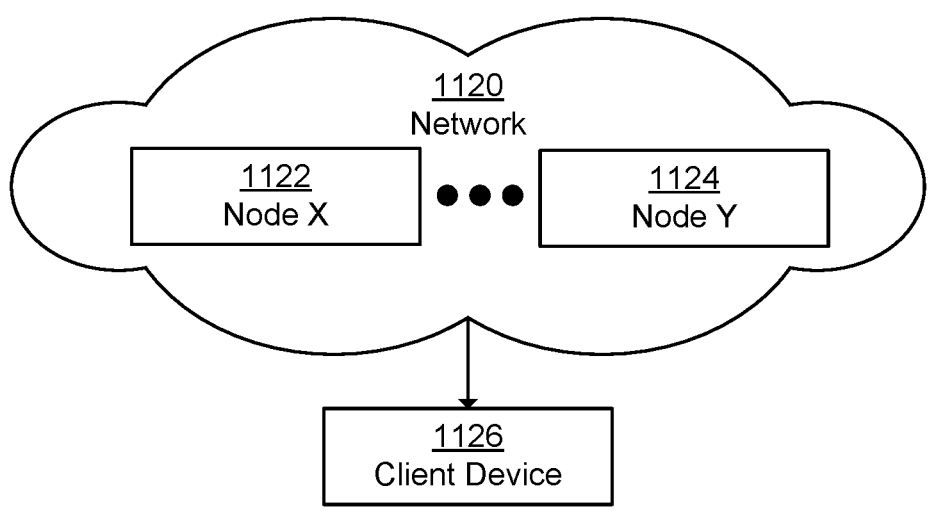

FIG. 11A and FIG. 11B are examples of a computing system and a network, in accordance with one or more embodiments of the invention. Embodiments of the invention may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 11A, the computing system (1100) may include one or more computer processor(s) (1102), non-persistent storage device(s) (1104) (e.g., volatile memory, such as random access memory (RAM), cache memory), persistent storage device(s) (1106) (e.g., a hard disk, an optical drive such as a compact disk (CD) drive or digital versatile disk (DVD) drive, a flash memory, etc.), a communication interface (1108) (e.g., Bluetooth interface, infrared interface, network interface, optical interface, etc.), and numerous other elements and functionalities that implement the features and elements of the disclosure.

The computer processor(s) (1102) may be an integrated circuit for processing instructions. For example, the computer processor(s) (1102) may be one or more cores or micro-cores of a processor. The computing system (1100) may also include one or more input device(s) (1110), such as a touchscreen, a keyboard, a mouse, a microphone, a touchpad, an electronic pen, or any other type of input device.

The communication interface (1108) may include an integrated circuit for connecting the computing system (1100) to a network (not shown) (e.g., a local area network (LAN), a wide area network (WAN) such as the Internet, mobile network, or any other type of network) and/or to another device, such as another computing device.

Further, the computing system (1100) may include one or more output device(s) (1112), such as a screen (e.g., a liquid crystal display (LCD), a plasma display, a touchscreen, a cathode ray tube (CRT) monitor, a projector, or other display device), a printer, an external storage, or any other output device. One or more of the output device(s) (1112) may be the same or different from the input device(s) (1110). The input and output device(s) (1110 and 1112) may be locally or remotely connected to the computer processor(s) (1102), non-persistent storage device(s) (1104), and persistent storage device(s) (1106). Many different types of computing systems exist, and the aforementioned input and output device(s) (1110 and 1112) may take other forms.

Software instructions in the form of computer readable program code to perform embodiments of the invention may be stored, in whole or in part, temporarily or permanently, on a non-transitory computer readable medium such as a CD, a DVD, a storage device, a diskette, a tape, a flash memory, a physical memory, or any other computer readable storage medium. Specifically, the software instructions may correspond to computer readable program code that, when executed by a processor(s), is configured to perform one or more embodiments of the invention.

The computing system (1100) in FIG. 11A may be connected to or be a part of a network. For example, as shown in FIG. 11B, the network (1120) may include multiple nodes (e.g., node X (1122), node Y (1124)). Each node may correspond to a computing system, such as the computing system (1100) shown in FIG. 11A, or a group of nodes combined may correspond to the computing system shown in FIG. 11A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (1100) may be located at a remote location and connected to the other elements over a network.

Although not shown in FIG. 11B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (1122), node Y (1124)) in the network (1120) may be configured to provide services for a client device (1126). For example, the nodes may be part of a cloud computing system. The nodes may include functionality to receive requests from the client device (1126) and transmit responses to the client device (1126). The client device (1126) may be a computing system, such as the computing system (1100) shown in FIG. 11A. Further, the client device (1126) may include and/or perform all or a portion of one or more embodiments of the invention.

The computing system (900) or group of computing systems described in FIGS. 11A and 11B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the GUI by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in a Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system (1100) in FIG. 11A. First, the organizing pattern (e.g., grammar, schema, layout) of the data is determined, which may be based on one or more of the following: a position (e.g., bit or column position, Nth token in a data stream, etc.), an attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as extensible markup language (XML)).

The extracted data may be used for further processing by the computing system. For example, the computing system (1100) of FIG. 11A, while performing one or more embodiments of the invention, may perform data comparison. Data comparison may be used to compare two or more data values (e.g., A, B). For example, one or more embodiments may determine whether A=B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (1100) in FIG. 11A may implement and/or be connected to a data repository. For example, one type of data repository is a database. A database is a collection of information configured for ease of data retrieval, modification, re-organization, and deletion. A Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (a database, a table, a record, a column, a view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (1100) of FIG. 11A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (1100) of FIG. 11A and the nodes (e.g., node X (1122), node Y (1124)) and/or client device (1126) in FIG. 11B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
generating a first overlap matrix from a first attribute comprising a first plurality of measurements of data items, and generating a second overlap matrix from a second attribute comprising a second plurality of measurements of the data items;
generating a plurality of samples of weights, each of the plurality of samples of weights including a corresponding first weight for the first overlap matrix and a corresponding second weight for the second overlap matrix;
combining, for each of the plurality of samples of weights, the first overlap matrix with the corresponding first weight and the second overlap matrix with the corresponding second weight;
generating a plurality of similarity matrices by combining, for each of the plurality of samples of weights, a weighted first overlap matrix with a weighted second overlap matrix;
performing a cluster analysis on the plurality of similarity matrices to generate a corresponding plurality of desired groupings for each of the plurality of similarity matrices, wherein each of the plurality of desired groupings represents a corresponding group of the data items, and wherein the plurality of desired groupings across the plurality of similarity matrices comprise a set of groupings; and
selecting a group from the set of groupings to obtain a selected grouping, wherein selecting comprises:
performing a frequency analysis on the set of groupings; and
selecting, based on the frequency analysis, a most frequently occurring group in the set of groupings.

2. The method of claim 1, wherein a first number of the plurality of samples of weights is exponentially greater than a second number of a plurality of attributes.

3. The method of claim 2, further comprising:
prior to clustering, setting a maximum group size for the set of groupings.

4. The method of claim 3, wherein the clustering is unstructured, and wherein the method further comprises:
reducing morphologically identical groupings from the set of groupings.

5. The method of claim 1, wherein selecting the selected grouping further comprises:
determining that all groupings in the set of groupings are unique;
generating a new plurality of samples of weights, each having a corresponding third weight and a corresponding fourth weight; and
selecting a new selected grouping by:
combining, for each of the new plurality of samples of weights, the first overlap matrix with the corresponding third weight and the second overlap matrix with the corresponding fourth weight;
generating a second plurality of similarity matrices by combining, for each of the new plurality of samples of weights, a weighted third overlap matrix with a weighted fourth overlap matrix;
performing clustering on the second plurality of similarity matrices to generate a second corresponding plurality of groupings for each of the second plurality of similarity matrices, wherein each of a second plurality of groupings represents a corresponding group of the data items, and wherein together all second groupings comprise a second set of groupings; and
selecting a second group from the second set of groupings to obtain a second selected grouping.

6. The method of claim 1, further comprising:
storing a selected sample of weights corresponding to the selected grouping;

receiving a new request to generate a new selected grouping using a third plurality of measurements for the first attribute and a fourth plurality of measurements for the second attribute;
generating a new plurality of samples of weights that are centered around the selected sample of weights; and
selecting the new selected grouping by:
    combining, for each of the new plurality of samples of weights, the first overlap matrix with a corresponding third weight and the second overlap matrix with a corresponding fourth weight;
    generating a second plurality of similarity matrices by combining, for each of the new plurality of samples of weights, a weighted third overlap matrix with a weighted fourth overlap matrix;
    performing a second cluster analysis on the plurality of similarity matrices to generate a corresponding plurality of groupings for each of the plurality of similarity matrices, wherein each of the plurality of groupings represents a corresponding group of the data items, and wherein together all groupings comprise a set of groupings; and
    selecting a second group from a second set of groupings to obtain the new selected grouping.

7. The method of claim 1, wherein a first number of the plurality of samples of weights generated is exponentially larger than a second number of attributes including at least the first attribute and the second attribute.

8. The method of claim 7, wherein selecting the selected grouping directly from the plurality of similarity matrices is computationally explosive, and wherein computationally explosive is defined as a sufficient number of computations that available physical computing system resources cannot perform a desired algorithm within a time limit pre-determined to be acceptable.

9. A method comprising:
receiving a data set representing information regarding a plurality of attributes, wherein each of the plurality of attributes represents a corresponding plurality of measurements for a corresponding plurality of data items;
determining, for each of the plurality of attributes, a plurality of overlapping matrices, representing overlapping ones of the corresponding plurality of measurements for each of the plurality of attributes;
generating a plurality of samples of weights, wherein each of the plurality of samples of weights includes a corresponding weight for each of the plurality of overlapping matrices;
determining a plurality of weighted overlap matrices by combining, for each of the plurality of samples of weights, a corresponding overlap matrix with the corresponding weight;
determining a plurality of similarity matrices by combining, for each of the plurality of samples of weights, the plurality of weighted overlap matrices;
performing a clustering analysis on the plurality of similarity matrices to identify, for each of the plurality of samples of weights, a corresponding plurality of desired groupings, wherein each of the corresponding plurality of desired groupings represents a corresponding group of the plurality of data items, and wherein the plurality of desired groupings across the plurality of similarity matrices comprise a set of groupings; and
selecting a group from the set of groupings to obtain a selected grouping, wherein selecting comprises:
    performing a frequency analysis on the set of groupings; and
    selecting, based on the frequency analysis, a most frequently occurring group in the set of groupings.

10. The method of claim 9, wherein a first number of the plurality of samples of weights is exponentially greater than a second number of the plurality of attributes.

11. The method of claim 10, further comprising:
prior to clustering, setting a maximum group size for the set of groupings.

12. The method of claim 11, wherein the clustering is unstructured, and wherein the method further comprises:
reducing morphologically identical groupings from the set of groupings.

13. The method of claim 9, wherein selecting the selected grouping further comprises:
determining that a threshold number of groupings in the set of groupings are unique;
generating a new plurality of samples of weights, each having a corresponding third weight and a corresponding fourth weight; and
selecting a new selected grouping by:
    combining, for each of the new plurality of samples of weights, a first overlap matrix with the corresponding third weight and a second overlap matrix with the corresponding fourth weight;
    generating a second plurality of similarity matrices by combining, for each of the new plurality of samples of weights, a weighted third overlap matrix with a weighted fourth overlap matrix;
    performing clustering on the second plurality of similarity matrices to generate a second corresponding plurality of groupings for each of the second plurality of similarity matrices, wherein each of a second plurality of groupings represents a corresponding group of the data items, and wherein together all second groupings comprise a second set of groupings; and
    selecting a second group from the second set of groupings to obtain a second selected grouping.

14. The method of claim 9, further comprising:
storing a selected sample of weights corresponding to the selected grouping;
receiving a new request to generate a new selected grouping using a third plurality of measurements for a first attribute and a fourth plurality of measurements for a second attribute;
generating a new plurality of samples of weights that are centered around the selected sample of weights; and
selecting the new selected grouping by:
    combining, for each of the new plurality of samples of weights, a first overlap matrix with a corresponding third weight and a second overlap matrix with a corresponding fourth weight;
    generating a second plurality of similarity matrices by combining, for each of the new plurality of samples of weights, a weighted third overlap matrix with a weighted fourth overlap matrix;
    performing a second cluster analysis on the plurality of similarity matrices to generate a corresponding plurality of groupings for each of the plurality of similarity matrices, wherein each of the plurality of groupings represents a corresponding group of the data items, and wherein together all groupings comprise a set of groupings; and
    selecting a second group from the second set of groupings to obtain the new selected grouping.

15. The method of claim 9, wherein a first number of the samples of weights generated is exponentially larger than a second number of attributes including at least a first attribute and a second attribute.

16. The method of claim 15, wherein selecting the selected grouping directly from the plurality of similarity matrices is computationally explosive, and wherein computationally explosive is defined as a sufficient number of computations that available physical computing system resources cannot perform a desired algorithm within a time limit pre-determined to be acceptable.

17. A system comprising:
a processor having a defined amount of processing resources; and
a data repository in communication with the processor, wherein the data repository stores:
  a plurality of attributes, each of the plurality of attributes representing a corresponding plurality of measurements for a corresponding plurality of data items;
  a plurality of overlapping matrices representing overlapping ones of the corresponding plurality of measurements for each of the plurality of attributes;
  a plurality of samples of weights, wherein each of the plurality of samples of weights includes a corresponding weight for each of the plurality of overlapping matrices;
  a plurality of weighted overlap matrices;
  a plurality of similarity matrices;
  corresponding pluralities of groupings representing groupings of the plurality of data items taken from a corresponding similarity matrix in the plurality of similarity matrices;
  a set of groupings representing the plurality of groupings across the plurality of similarity matrices;
  a selected grouping selected from the set of groupings; and
an overlapping matrix generator configured to determine the plurality of overlapping matrices;
a weight generator configured to generate the plurality of samples of weights;
a similarity matrix generator configured to:
  determine the plurality of weighted overlap matrices by combining, for each of the plurality of samples of weights, a corresponding overlap matrix with the corresponding weight; and
  determine the plurality of similarity matrices by combining, for each of the plurality of samples of weights, the plurality of weighted overlap matrices; and
a group selector configured to:
  perform a cluster analysis on the plurality of similarity matrices to identify, for each of the plurality of samples of weights, the corresponding pluralities of groupings;
  select the selected grouping from the set of groupings by being further configured to:
    perform a frequency analysis on the set of groupings; and
    select, based on the frequency analysis, a most frequently occurring group in the set of groupings; and
  report the selected grouping.

* * * * *